United States Patent [19]

Klein

[11] Patent Number: 5,965,000
[45] Date of Patent: Oct. 12, 1999

[54] STORAGE-STABLE, SINGLE-COMPONENT CONCENTRATE, PRODUCTION AND USE THEREOF FOR THE PRODUCTION OF CATHODICALLY DEPOSITABLE ELECTROCOATING LACQUER BATHS

[75] Inventor: Klausjörg Klein, Wuppertal, Germany

[73] Assignee: Herberts GmbH, Wuppertal, Germany

[21] Appl. No.: 08/860,625

[22] PCT Filed: Nov. 23, 1995

[86] PCT No.: PCT/EP95/04613

§ 371 Date: May 27, 1997

§ 102(e) Date: May 27, 1997

[87] PCT Pub. No.: WO96/17023

PCT Pub. Date: Jun. 6, 1996

[30] Foreign Application Priority Data

Nov. 30, 1994 [DE] Germany .................... 44 42 509

[51] Int. Cl.$^6$ .................................................. C09D 5/44
[52] U.S. Cl. ............................................ 204/502; 204/480
[58] Field of Search .................................. 204/502, 503, 204/506, 471, 480; 523/402

[56] References Cited

U.S. PATENT DOCUMENTS

| 4,476,261 | 10/1984 | Patzschke et al. | 523/402 |
| 4,683,285 | 7/1987 | Paar et al. | 528/113 |
| 4,808,658 | 2/1989 | Walz et al. | 524/591 |
| 5,101,000 | 3/1992 | Paar et al. | 528/111 |
| 5,185,065 | 2/1993 | Chung et al. | 204/181.4 |
| 5,352,525 | 10/1994 | Huemke et al. | 428/418 |

FOREIGN PATENT DOCUMENTS

| 0 203 024 | 11/1986 | European Pat. Off. . |
| 0 408 186 | 1/1991 | European Pat. Off. . |

OTHER PUBLICATIONS

H. Kittel, *Lehrbuch der Lacke und Beschichtungen*, vol. 7, pp. 164–167 (partial English translation), 1979.

*Primary Examiner*—Kathryn Gorgos
*Assistant Examiner*—Wesley A. Nicolas
*Attorney, Agent, or Firm*—Merchant & Gould P.C.

[57] ABSTRACT

Concentrate containing cathodically depositable binders, optionally crosslinking agents, optionally organic solvents, pigments and optionally extenders, together with water, having a solids content of 35 to 50 wt. % at a weight ratio of pigment and optionally extender to binder and crosslinking agent of 0.01:1 to 0.4:1, having a viscosity of 100 to 500 mPa•s, measured by rotational viscosimetry at 20° C. and a shear gradient of 150 s$^{-1}$ and a solvent content of 0 to below 20 wt. %, relative to solids content, process for the production thereof and use thereof in processes for producing or replenishing cathodically depositable electrocoating lacquer baths.

7 Claims, No Drawings

STORAGE-STABLE, SINGLE-COMPONENT CONCENTRATE, PRODUCTION AND USE THEREOF FOR THE PRODUCTION OF CATHODICALLY DEPOSITABLE ELECTROCOATING LACQUER BATHS

This invention relates to the production of storage-stable and low-solvent, single-component concentrates suitable for the production of opaquely pigmented cathodically depositable electrocoating lacquer (cathodic electrocoating lacquer) baths.

It also relates to the production of the concentrates and to the use thereof in processes for producing or replenishing cathodic electrocoating lacquer baths.

BACKGROUND OF THE INVENTION

Cathodically depositable electrocoating lacquer baths used in industrial applications are operated at bath solids contents of generally between 10 and 25 wt. %. The solvent content thereof should be as low as possible.

It is known for users to prepare or make good the solids content of electrocoating lacquer baths using single-component concentrates. These concentrates are produced by grinding the pigments and extenders in the organic solution of a cathodic electrocoating lacquer binder, neutralisation with acid and, generally, dilution with water. The concentrates contain little or no water and are generally completely neutralised. They are usually supplied to users at a solids content of above 50 wt. % and a solvent content of between 20 and 40 wt. %. The concentrates are stable in storage, i.e. they do not require constant mixing, for example by stirring. The concentrates have elevated viscosities of, for example, above 2000 mPa·s at 20° C. When a cathodic electrocoating lacquer bath is first prepared, the user must mix them with water or, if the solids content is to be made good, with solids-depleted cathodic electrocoating lacquer bath contents. As a consequence of the great differences in viscosity, this requires specific technical equipment and methods and is highly labour intensive. These single-component concentrates are thus conveyed from the delivery containers using pumps suitable for thick materials and prediluted in continuously or discontinuously operated pre-mixing apparatus to a solids content of generally below 30 wt. %. If immobile, for example if unstirred, these premixes are either not stable in storage or stable for only a short period; they may be further diluted without any particular effort to yield the finished cathodic electrocoating lacquer bath. The finished cathodic electrocoating lacquer baths produced in this manner have undesirably high solvent contents of, for example, above 4 wt. % at a bath solids content of 20 wt. %. This corresponds to an organic solvent content of 20 to 50 wt. %, relative to the solids content of the cathodic electrocoating baths.

Alternatively, two-component cathodic electrocoating lacquer materials have been developed from which users may first prepare cathodic electrocoating lacquer baths by dilution with water or with which solids content may be made good by mixing with solids-depleted cathodic electrocoating lacquer bath contents (c.f. EP-A-0 183 025, EP-A-0 203 024 and H. Kittel, *Lehrbuch der Lacke und Beschichtungen*, volume 7, Verlag W. A. Colomb, Berlin, 1979, page 166). The two-component cathodic electrocoating lacquer materials are a) a binder component in the form of a solvent-free or low-solvent, aqueous dispersion of the cathodic electrocoating lacquer binder and any optionally present crosslinking agent (cathodic electrocoating lacquer dispersion) and b) a separate pigment paste, which is generally produced by grinding the pigments and extenders in a special paste resin. Both components are stable in storage even without stirring and, by virtue of their low viscosity of generally below 500 mPa·s measured by rotational viscosimetry at 20° C. and a shear gradient of 150 s$^{-1}$, may be handled by users without requiring any particular equipment. Both components are compatible with the cathodic electrocoating lacquer bath contents, while directly mixing the two components together generally gives rise to incompatibilities and/or stability problems, frequently after only brief storage. Dilution with water or with solids-depleted cathodic electrocoating lacquer bath contents is thus performed separately, for example by separate or parallel apportionment into the solids-depleted cathodic electrocoating lacquer bath. In order to maintain constant deposition characteristics and lacquer film parameters, the user must apportion the two components at a fixed ratio one to the other to the cathodic electrocoating lacquer bath, so entailing the possibility of errors. Logistical requirements are greater than working with a single-component material, for example storage is more costly and the user's testing costs are multiplied. Cathodic electrocoating lacquer baths produced on the basis of two-component cathodic electrocoating lacquer materials have a low organic solvent content of, for example, below 4 wt. % at a bath solids content of 20 wt. %, corresponding to a solvent content of 0 to 20 wt. %, relative to the bath solids content.

The object arose of providing a single-component concentrate which is suitable for producing and making good the solids content of opaquely pigmented, cathodically depositable electrocoating lacquer baths containing no or little solvent, which is stable in storage in the immobile state and may be handled simply by users. It should not entail any elaborate logistics.

SUMMARY OF THE INVENTION

This object is achieved by the provision of an opaquely pigmented aqueous cathodic electrocoating lacquer concentrate containing one or more cathodically depositable binders, optionally one or more crosslinking agents for the binders, optionally one or more organic solvents, one or more pigments and optionally extenders, together with water, which concentrate is characterised in that the solids content thereof is 35 to 50 wt. %, at a weight ratio of pigment and optionally extender to binder plus optionally present crosslinking agents of 0.01:1 to 0.4:1, the viscosity thereof is 100 to 500 mPa·s, measured by rotational viscosimetry at 20° C. and a shear gradient of 150 s$^{-1}$, and the solvent content thereof is 0 to below 20 wt. %, preferably below 5 wt. %, relative to solids content.

The cathodic electrocoating lacquer concentrate may in principle be produced by colouring a cathodic electrocoating lacquer dispersion containing one or more cationic binders and optionally one or more crosslinking agents with pigments and optionally extenders as such and/or with preparations containing one or more pigments and optionally extenders; it is possible in this connection to perform the colouring during production of the cathodic electrocoating lacquer dispersion, such as for example during binder production.

For the purposes of the invention, it has, however, been found that it is particularly favourable and preferred to mix an aqueous dispersion containing one or more cathodically depositable binders, optionally one or more crosslinking agents for the binders and optionally one or more organic solvents, which dispersion has a viscosity of 500 to 2000 mPa•s, measured by rotational viscosimetry at 20° C. and a shear gradient of 150 s$^{-1}$, with a preparation which contains one or more pigments and optionally extenders, together with one or more water-miscible organic solvents and/or water and has a viscosity of 50 to 10000 mPa•s, preferably of below 2000 mPa•s, measured by rotational viscosimetry at 20° C. and a shear gradient of 150 s$^{-1}$. It has surprisingly been found that mixing such components gives rise to a concentrate which has a lower viscosity than the starting dispersions or preparations used for the production thereof.

The cathodic electrocoating lacquer composition according to the invention consists of only one component. It is surprisingly stable in storage even without stirring and it is suitable both for initially preparing cathodic electrocoating lacquer baths and for making good the solids content of such baths which are in operation and which have been depleted in solids by electrodeposition.

DETAILED DESCRIPTION OF THE INVENTION

Cathodic electrocoating lacquer dispersions containing cationic binders and optionally crosslinking agents which may be used for the production of cathodic electrocoating lacquer baths are known. The cationic binders are binders which bear cationic groups or basic groups convertible into cationic groups, for example amino, ammonium, for example quaternary ammonium, phosphonium and/or sulphonium groups. Binders having basic groups are preferred. Basic groups containing nitrogen, such as amino groups, are particularly preferred. These groups may be present in quaternised form or they may be converted, as is familiar to the person skilled in the art, into cationic groups with a conventional neutralising agent, for example an organic monocarboxylic acid, such as for example lactic acid, formic acid, acetic acid. Such basic resins are, for example, resins containing primary, secondary and/or tertiary amino groups. The amine values of such resins are, for example, some 20 to 250 mg KOH/g. The weight average molecular weight ($M_w$) of the resins is preferably 300 to 10000. Examples of such resins are amino(meth)acrylate resins, aminoepoxy resins, aminoepoxy resins having terminal double bonds, aminoepoxy resins having primary OH groups, aminopolyurethane resins, polybutadiene resins containing amino groups or modified epoxy resin/carbon dioxide/amine reaction products. These resins may be self-crosslinking or they are used mixed with known crosslinking agents. Examples of such crosslinking agents are amino resins, blocked polyisocyanates, crosslinking agents having terminal double bonds, polyepoxy compounds or crosslinking agents containing transesterifiable and/or transamidatable groups.

Examples of resins and crosslinking agents used in cathodic electrocoating lacquer coating compositions which may be used according to the invention in the production of the cathodic electrocoating lacquer dispersions or cathodic electrocoating lacquer concentrates are described in EP-A-0 082 291, EP-A-0 178 531, EP-A-0 209 857, EP-A-0 227 975, EP-A-0 245 786, EP-A-0 261 385, EP-A-0 310 971, EP-A-0 333 327, EP-A-0 456 270, EP-A-0 476 514, U.S. Pat. No. 3,922,253, DE-A-33 24 211. These resins may be used alone or as a mixture. The use of binder systems according to EP-A-0 234 395 and EP-A-0 414 199 has proved particularly successful for the purposes of the invention.

Cathodic electrocoating lacquer dispersions are produced by synthesising binders containing cationic groups or groups convertible into cationic groups in the presence or absence of organic solvents and converting these into an aqueous dispersion by diluting the previously acid-neutralised binders with water. The binder or binders may be mixed with one or more suitable crosslinking agents and converted together with these into the aqueous dispersion. Any organic solvent may, if present, be removed down to the desired content, for example by vacuum distillation, before or after conversion into the aqueous dispersion. Subsequent solvent removal may be avoided, for example, if the cationic binders, which are optionally present mixed with crosslinking agents, are neutralised with acid in a low-solvent or solvent-free state, for example as a solvent-free melt at temperatures of, for example, up to 140° C. and then converted with water into the cathodic electrocoating lacquer dispersion. It is also possible and, for the purposes of the present invention, preferred to avoid organic solvent removal if the binders are initially introduced as a solution in a free-radically polymerisable, olefinically unsaturated monomer or if binder synthesis is performed in a free-radically polymerisable monomer (for example styrene) as the solvent, and the product is then converted into an aqueous dispersion by neutralisation with acid and dilution with water and the free-radically polymerisable monomer is then completely polymerised, as described in EP-A-0 622 389.

The cathodic electrocoating lacquer dispersions to be coloured preferably have an organic solvent content of below 5 wt. %, relative to the solids content of the dispersion.

The cathodic electrocoating lacquer dispersions to be coloured generally have solids contents of between 35 and 50 wt. %.

It is essential to the invention that the cathodic electrocoating lacquer dispersion used for the production of the concentrates has a viscosity of 500 to 2000 mPa•s, measured by rotational viscosimetry at 20° C. and a shear gradient of 150 s$^{-1}$. The viscosity of these cathodic electrocoating lacquer dispersions to be coloured may be influenced by various parameters in a manner familiar to the person skilled in the art, substantially, for example, by appropriate selection of the solids content, degree of neutralisation, solvent content and/or nature of the solvents.

The cathodic electrocoating lacquer concentrates prepared according to the invention are opaquely pigmented and contain pigments and optionally extenders, but no dyes soluble in water or in organic media.

Examples of pigments and extenders are the conventional inorganic and/or organic pigments such as carbon black, graphite, carbon from the most various sources, titanium dioxide, iron oxide, kaolin, talcum or silicon dioxide, azo pigments, phthalocyanine pigments, as well as anticorrosion pigments, such as for example zinc phosphate. Pigments preferred for the purposes of the invention are carbon blacks and titanium dioxide.

The cathodic electrocoating lacquer concentrates prepared according to the invention are opaquely pigmented with pigments and optionally extenders. Opaque pigmenting should be taken to mean that the lacquer films deposited from cathodic electrocoating lacquer baths produced or operated using the cathodic electrocoating lacquer concentrates exhibit opacity at a dry film thickness of 15 $\mu$m or less.

The cathodic electrocoating lacquer concentrates are pigmented by colouring cathodic electrocoating lacquer dispersions. Agents used to colour the cathodic electrocoating lacquer dispersions are pigments as such, i.e. in powder form, or preferably preparations containing pigments and optionally extenders. Examples of preparations are pigment pastes, as are conventional for cathodic electrocoating lacquer systems and may be produced by dispersing pigments and optionally extenders to a desired fineness in cathodic electrocoating lacquer binders or cathodic electrocoating lacquer paste resins. Resins suitable for dispersion are familiar to the person skilled in the art. Examples of cathodic electrocoating lacquer paste resins are described in EP-A-0 183 025 and in EP-A-0 469 497. It has been found that it is not necessary to produce the preparations in the presence of binders or paste resins. If binders or paste resins are used, they are preferably used in small quantities, for example such that a pigment/resin (binder and/or paste resin) ratio of greater than 7:1 is obtained. Particularly preferred examples of preparations containing pigments and optionally extenders which are usable according to the invention are pigment suspensions (pigment slurries) or ground pigment preparations in water and/or organic, water-miscible solvents, such as glycols, for example ethylene glycol, propylene glycol; alcohols, for example sec.-butanol and hexanol; glycol ethers, for example ethoxypropanol, methoxypropanol and butoxyethanol. Such ground pigment preparations are also commercially available and are offered for sale, for example by the company Hoechst under the name Colanyl® a trademarked product which is a pigment-slurry which is free from resins. The preparations used for colouring may contain one or more pigments and optionally extenders. For the purposes of the invention, extenders are preferably avoided during colouring.

It is also essential to the invention that the preparations containing pigments and optionally extenders have viscosities of 50 to 10000 mPa·s, preferably of below 2000 mPa·s, measured at 20° C. and a shear gradient of 150 s$^{-1}$.

The cathodic electrocoating lacquer dispersions may be opaquely pigmented during the production thereof with pigments in powder form and/or with preparations containing pigments and optionally extenders. Colouring during the production process of the cathodic electrocoating lacquer dispersion may be achieved, for example, by initially introducing the colouring agent before adding the cationic binder optionally mixed with a crosslinking agent as a melt or as an organic solution or by adding the colouring agent at any desired point before or during synthesis of the cationic binder and then converting the result into the opaquely pigmented cathodic electrocoating lacquer concentrate by neutralisation with acid and dilution with water.

It is preferred to colour the finished cathodic electrocoating lacquer dispersion. Pigments as such in powder form may be used for this purpose and/or the preparations explained above containing pigments and optionally extenders are preferably used. Pulverulent pigments are sprinkled in, while the preferably used preparations containing pigments and optionally extenders are apportioned as liquid materials. Opaque colouring is preferably performed immediately after preparation of the cathodic electrocoating lacquer dispersion, i.e. the cathodic electrocoating lacquer dispersion is preferably coloured by the manufacturer of the cathodic electrocoating lacquer concentrate according to the invention. In particular, it is preferred to perform colouring in the same container in which the cathodic electrocoating lacquer dispersion was previously produced, in fact immediately after the production thereof. The cathodic electrocoating lacquer dispersion is preferably coloured at elevated temperature, for example between 35 and 60° C.

In addition to the base resins, the optionally present crosslinking agents, the pigments and optionally present extenders, the cathodic electrocoating lacquer concentrates may contain conventional lacquer additives. Possible additives are, for example, the additives conventional for cathodic electrocoating lacquer coating compositions. Examples of these are wetting agents, neutralising agents, levelling agents, catalysts, anti-foaming agents, solvents together with conventional anti-cratering additives. The additives may be incorporated into the cathodic electrocoating lacquer concentrate during synthesis of the binder, during production of the cathodic electrocoating lacquer dispersion or during colouring, for example via the preparation containing pigments.

The cathodic electrocoating lacquer concentrates according to the invention preferably contain crosslinking catalysts, such as for example the metal compounds conventional for this purpose. Examples are compounds of lead, tin, titanium, iron and lanthanum. The catalytically active metal compounds contained in the cathodic electrocoating lacquer concentrates according to the invention are preferably at least partially water-soluble. Examples of suitable water-soluble metal compounds are lead acetate and iron acetylacetonate. However, it is in particular preferred that the cathodic electrocoating lacquer concentrates according to the invention contain no heavy metal compounds which are questionable on health grounds, for example that they are lead-free.

Particularly preferred cathodic electrocoating lacquer concentrates according to the invention are those containing added bismuth as the catalyst as bismuthates and/or in the form of organic bismuth complexes and/or as bismuth salts of organic carboxylic acids. These are described in the as yet unpublished German patent application P 43 30 002.2 from the same applicant. The salts may be those of an organic mono- or polycarboxylic acid. Acetylacetone may be mentioned as an example of a complexing ligand. Other organic complexing agents having one or more complexing groups are, however, also possible. Examples of suitable organic carboxylic acids, from which bismuth salts usable for the purposes of the invention are derived, are aromatic, araliphatic and aliphatic mono- or dicarboxylic acids. Preferred bismuth salts are those of organic monocarboxylic acids, in particular having more than two C atoms, especially those of hydroxycarboxylic acids. Examples are bismuth salicylate, bismuth 4-hydroxybenzoate, bismuth lactate, bismuth dimethylolpropionate. The bismuth salts of aliphatic hydroxycarboxylic acids are particularly suitable. The quantity of the bismuth compound in the cathodic electrocoating lacquer concentrate may be, for example, 0.1 to 5 wt. %, preferably 0.5 to 3.0 wt. %, calculated as bismuth and relative to the binder solids content of the cathodic electrocoating lacquer concentrate. The bismuth compound may be present in the cathodic electrocoating lacquer concentrate according to the invention dissolved in the aqueous or disperse phase, finely divided, for example in colloidal form, or as a ground powder. The compound is preferably at least partially water-soluble; it is particularly preferably water-soluble.

The above-stated bismuth compounds may be incorporated into the cathodic electrocoating lacquer concentrate in various ways. For example, the bismuth compounds may be added to the neutralised binder solution, optionally at elevated temperature, and then homogenised by stirring, before conversion into the cathodic electrocoating lacquer dispersion by the addition of substantial quantities of water as the diluent. Where hydroxycarboxylic acids, such as for example lactic acid or dimethylolpropionic acid, are used as the neutralising agent for the binder, it is also possible to use the appropriate quantities of bismuth oxide or hydroxide, wherein the corresponding bismuth salt is formed in situ.

It is also possible to incorporate the bismuth compound into the cathodic electrocoating lacquer concentrate, for example, as a constituent of the colouring agent, for example of the above-mentioned pigment pastes. If the bismuth compounds are water-soluble or are dissolved in solubilising agent, they may be added to the finished cathodic electrocoating lacquer binder dispersion before it is coloured or to the per se finished cathodic electrocoating lacquer concentrate.

It is of essential significance to the invention that the nature and quantity of the cathodic electrocoating lacquer dispersion, the agents used for colouring and the optionally added conventional lacquer additives are selected in such a manner that the resultant cathodic electrocoating lacquer concentrate has a solids content of between 35 and 50 wt. % and a weight ratio of pigment optionally plus extender to binder and optionally crosslinking agent solids content of between 0.01:1 and 0.4:1, preferably below 0.2:1. The process is furthermore performed in such a manner that the finished cathodic electrocoating lacquer concentrate has a viscosity of between 100 and 500 mPa•s, measured by rotational viscosimetry at 20° C. and a shear gradient of 150 $s^{-1}$, and the solvent content thereof is less than 20 wt. %, preferably 15 wt. %, relative to solids content.

Once all the necessary components have been added, the cathodic electrocoating lacquer concentrate may optionally be adjusted to the above-stated solids content and the stated viscosity values by dilution with water.

The cathodic electrocoating lacquer concentrates prepared according to the invention may be used by the user without any special apparatus to prepare cathodic electrocoating lacquer baths by dilution with appropriate quantities of water, or during operation cathodic electrocoating lacquer baths depleted in solids by lacquer deposition are mixed with an appropriate quantity of cathodic electrocoating lacquer concentrate according to the invention in order to make good the solids content. It is, of course, preferred that both the bath contents and the cathodic electrocoating lacquer concentrate according to the invention are largely identical with regard to the qualitative and quantitative composition of the solids content thereof.

Electrically conductive substrates may be coated in the conventional manner by cathodic electrodeposition from the cathodic electrocoating lacquer baths produced or operated using the cathodic electrocoating lacquer concentrates according to the invention.

The cathodic electrocoating lacquer concentrates according to the invention may be delivered from the manufacturer to the user without having to be stirred during transport and they may also be stored for an extended period on the user's premises without stirring, for example for up to 3 months, and may be handled there without any particular effort. Since the cathodic electrocoating lacquer concentrates according to the invention are single-component materials, logistical and testing requirements are reduced in comparison with the currently widespread practice of using two-component cathodic electrocoating lacquer materials. The cathodic electrocoating lacquer baths produced and operated using the cathodic electrocoating lacquer concentrates according to the invention have low solvent contents of for example below 4 wt. %, preferably of below 3 wt. %, at a solids content of 20 wt. %, corresponding to a solvent content of below 20 wt. %, relative to bath solids.

EXAMPLE 1

(Production of an Aminoepoxy Resin)

21 g of diethanolamine, 10.2 g of 3-dimethylamino-1-propylamine and 61.6 g of an addition product of 116 g of 1,6-diaminohexane with 500 g of Cardura E 10® a trademarked product which is a verstic acid glycidyl ester, the glycidyl ester of an alpha-branched $C_9$ to $C_{11}$ monocarboxylic acid, are added to a solution of 283.2 g of polyglycidyl ether based on bisphenol A (epoxy equivalent weight=472) in 202 g of ethoxyethanol. The polyether and amine mixture reacts for 4 hours at a temperature of 85 to 90° C. with stirring. The temperature is then raised to 120° C. for one further hour to complete the reaction. The epoxy content is then zero.

Amine value: 98 mg KOH/g solid resin;

Solids content: 65 wt. %.

EXAMPLE 2

(Production of an Aminoepoxy Resin)

A mixture prepared from 89.2 of a reaction product of 1 mol of polypropylene oxide diglycidol (epoxy equivalent weight=317) with 2 mol of versatic acid, 1112 g of an epoxy resin based on bisphenol A (epoxy equivalent weight=469) and 113.4 g of a reaction product prepared from polypropylene oxide diglycidol and bisphenol A (epoxy equivalent weight=469) is cautiously melted homogeneously. After cooling to 68° C., 62.3 g of N-methyl-ethanolamine are added dropwise in 25 minutes, wherein the temperature rises to 76° C. After a further 20 minutes, a mixture of 42.3 g of 3-dimethylamino-1-propylamine and a reaction product prepared from 46.7 g of 1,6-diaminohexane with 209 g of Cardura E 10® a trademarked product which is a verstic acid glycidyl ester, the glycidyl ester of an alpha-branched $C_6$ to $C_{11}$ monocarboxylic acid, is added, heated to 125° C. and kept at 125° C. for one hour. A solids content of 65 wt. % is then established with ethoxyethanol.

Comparative test A (production of a cathodic electrocoating lacquer bath from a prior art single-component cathodic electrocoating lacquer concentrate)

108.6 parts of the aminoepoxy resin solution from Example 1, 7.0 parts of the aminoepoxy resin solution from Example 2, 0.6 parts of a 50% solution of Surfinol 104® a trademarked product which is tetramethyldecyndiole (a usual lacquer additive) (tetramethyldecynediol) in butoxyethanol and 2.0 parts of 85% formic acid are mixed together homogeneously. 0.4 parts of carbon black, 19.6 parts of titanium dioxide, 4.8 parts of Texanol® a trademarked product which is a solvent, i.e., 2,2,4-trimethyl-1,3-pentandiol-isobutyrate and 10.0 parts of a 25% aqueous solution of bismuth dimethylolpropionate bishydroxide, $Bi(OH)_2C_5H_9O_4$, are then added in a high-speed stirrer, predispersed for 30 minutes and then completely dispersed in a bead mill. 39.0 parts of a 64% solution of an addition product prepared from 1 mol of trimethylolpropane, 3 mol of tolylene diisocyanate and 3 mol of butoxyethanol in a 1:6 mixture of butoxyethanol and ethoxyethanol are then added and homogeneously mixed. A single-component, storage-stable cathodic electrocoating lacquer concentrate is obtained having a solids content of 64 wt. % and a viscosity of 12900 mPa•s, measured by rotational viscosimetry at 20° C. and a shear gradient of 8 $s^{-1}$. Due to the elevated water threshold, the product is then cautiously diluted with portions of deionised water in a high-speed stirrer to yield the finished cathodic electrocoating lacquer bath. The finished cathodic electrocoating lacquer bath has a solids content of 20 wt. % and a solvent content of 9.7 wt. %.

Comparative test B (production of a cathodic electrocoating lacquer bath from a cathodic electrocoating lacquer dispersion and a pigment paste)

a) 108.6 parts of the aminoepoxy resin solution from Example 1, 39.0 parts of a 64% solution of an addition product prepared from 1 mol of trimethylolpropane, 3 mol of tolylene diisocyanate and 3 mol of butoxyethanol in a 1:6 mixture of butoxyethanol and ethoxyethanol and 4.8 parts of Texanol® a trademarked product which is a solvent, i.e., 2,2,4-trimethyl-1,3-pentandiol-isobutyrate (2,2,4-trimethyl-1,3-pentanediol monoisobutyrate) are mixed together homogeneously. After removing 49.6 parts of ethoxyethanol by vacuum distillation and adding 1.5 parts of 85% formic acid, 159.7 parts of deionised water and 10.0 parts of a 25% aqueous solution of bismuth dimethylolpropionate bishydroxide, $Bi(OH)_2C_5H_9O_4$, a storage-stable cathodic electrocoating lacquer dispersion is obtained having a solids content of 36 wt. % and a viscosity of 62 mPa•s, measured by rotational viscosimetry at 20° C. and a shear gradient of 150 $s^{-1}$.

b) 7.0 parts of the aminoepoxy resin solution from Example 2, 0.6 parts of a 50% solution of Surfinol 104® a trademarked product which is tetramethyldecyndiole (a usual lacquer additive) in butoxyethanol, 0.5 parts of 85% formic acid and 19.9 parts of deionised water are homogeneously mixed together. 0.4 parts of carbon black and 19.6 parts of titanium dioxide are then added in a high-speed stirrer, predispersed for 30 minutes and then completely dispersed in a bead mill. A storage-stable pigment paste is obtained having a solids content of 52 wt. % and a viscosity of 284 mPa•s, measured by rotational viscosimetry at 20° C. and a shear gradient of 150 $s^{-1}$.

c) 45.7 parts of the cathodic electrocoating lacquer dispersion obtained in a) and 46.3 parts of deionised water are mixed together with a paddle agitator. Once 8 parts of the pigment paste obtained in b) have been added, a finished cathodic electrocoating lacquer bath is obtained having a solids content of 20 wt. % and a solvent content of 1.6 wt. %.

A mixture prepared from 45.7 parts of the cathodic electrocoating lacquer dispersion obtained in a) and 8 parts of the pigment paste obtained in b) is not stable in storage without constant stirring (with inter alia flocculation and sedimentation occurring).

EXAMPLE 3

(Production of a Cathodic Electrocoating Lacquer Bath From a Single-component Cathodic Electrocoating Lacquer Concentrate According to the Invention; Example According to the Invention)

a) 108.6 parts of the aminoepoxy resin solution from Example 1, 4.0 parts of the aminoepoxy resin solution from Example 2, 39.0 parts of a 64% solution of an addition product prepared from 1 mol of trimethylol-propane, 3 mol of tolylene diisocyanate and 3 mol of butoxyethanol in a 1:6 mixture of butoxyethanol and ethoxyethanol and 4.8 parts of Texanol® a trademarked product which is a solvent, i.e., 2,2,4-trimethyl-1,3-pentandiol-isobutyrate are mixed together homogeneously. After removing 49.6 parts of ethoxyethanol by vacuum distillation and adding 1.6 parts of 85% formic acid, 146.4 parts of deionised water and 10.0 parts of a 25% aqueous solution of bismuth dimethylolpropionate bishydroxide, $Bi(OH)_2C_5H_9O_4$, a cathodic electrocoating lacquer dispersion is obtained having a solids content of 38 wt. % and a viscosity of 584 mPa•s, measured by rotational viscosimetry at 20° C. and a shear gradient of 150 $s^{-1}$.

b) 3.0 parts of the aminoepoxy resin solution from Example 2, 0.6 parts of a 50% solution of Surfinol 104® a trademarked product which is tetramethyldecyndiole (a usual lacquer additive) in butoxyethanol, 0.4 parts of 85% formic acid and 12.4 parts of deionised water are homogeneously mixed together. 19.6 parts of titanium dioxide are then added in a high-speed stirrer and the mixture dispersed for 30 minutes in the high-speed stirrer. A pigment suspension is obtained having a viscosity of 234 mPa•s, measured by rotational viscosimetry at 20° C. and a shear gradient of 150 s–$^{1}$. This suspension is stirred into the cathodic electrocoating lacquer dispersion from a). 1.2 parts of an aqueous ground carbon black preparation (carbon black content= 33 wt. %, water content=42 wt. %, solvent content=25 wt. % propylene glycol) having a viscosity of 511 mPa•s, measured by rotational viscosimetry at 20® C. and a shear gradient of 150 $s^{-1}$, is then homogeneously stirred in. A cathodic electrocoating lacquer concentrate which is stable in storage even after three months' storage without stirring is obtained having a solids content of 41 wt. % and a viscosity of 187 mPa•s, measured by rotational viscosimetry at 20° C. and a shear gradient of 150 $s^{-1}$. A finished cathodic electrocoating lacquer bath having a solids content of 20 wt. % and a solvent content of 1.7 wt. % is obtained by dilution with deionised water.

The cathodic electrocoating lacquer baths obtained according to comparative tests A and B and Example 3 each have an identical solids composition. Lacquer films deposited from them onto metallic substrates and stoved have identical technical properties.

I claim:

1. A concentrate suitable for producing and replenishing cathodically depositable electrocoating lacquer baths, comprising: one or more cathodically depositable binders, one or more organic solvents, one or more pigments, together with water, wherein the solids content thereof is 35 to 50 wt. %, at a weight ratio of pigment to binder of 0.01:1 to 0.4:1, the viscosity thereof is 100 to 500 mPa•s, measured by rotational viscosimetry at 20 C and a shear gradient of 150 $s^{-1}$, and the organic solvent content thereof is 0 to below 20 wt. % relative to solids content, which concentrate is produced by a process of mixing an aqueous dispersion of one or more of the cathodically depositable binders with a preparation of one or more of the pigments, one or more water-miscible organic solvents and water;

wherein the aqueous dispersion has a viscosity of 500 to 2,000 mPa•s and the preparation has a viscosity of 50 to 10,000 mPa•s, the viscosities being measured by rotational viscosimetry at 20 C and a shear gradient of 150 $s^{-1}$, and wherein the viscosities of the aqueous dispersion and preparation are greater than the viscosity of the concentrate.

2. A process for producing or replenishing cathodically depositable electrocoating lacquer baths, comprising mixing a concentrate according to claim 1 with water or with a cathodically depositable electrocoating lacquer bath depleted in solids by cathodic deposition while achieving an organic solvent content of below 4 wt. % in the bath.

3. A process according to claim 2 wherein the concentrate is mixed with the cathodically depositable electrocoating lacquer bath.

4. A cathodically depositable electrocoating lacquer bath, produced by the process according to claim 3.

5. A concentrate according to claim 1 further comprising one or more cross-linking agents for the binders, wherein the cross-linking agent or agents are present in the aqueous dispersion, and the solid content thereof is 35–50 wt. % at a weight ratio of pigment to binder plus cross-linking agent or agents of 0.01:1 to 0.4:1.

6. A concentrate according to claim 1 wherein the aqueous dispersion contains organic solvent.

7. A concentrate according to claim 1 further comprising 1 or more extenders, wherein the extender or extenders are present in the preparation and the solids content thereof is 35–50 wt. % at a weight ratio of pigment and extender or extenders to binder of 0.01:1 to 0.4:1.

* * * * *